Patented Nov. 15, 1927.

1,649,051

UNITED STATES PATENT OFFICE.

RICHARD WOLFFENSTEIN, OF BERLIN, GERMANY.

PROCESS FOR PRODUCING HALOGEN-ALBUMIN COMPOUNDS.

No Drawing. Application filed February 2, 1924, Serial No. 690,298, and in Germany March 29, 1923.

It is known that for achieving certain physiological effects it is of importance to cause iodine as well as other halogens to act upon the organism since the various halogens such as iodine, bromine, chlorine, flourine etc., influence one another in their action.

Up till now only albumin compounds containing a single halogen have been produced. Obviously it has been assumed that during halogenation different kinds of halogens act in a mutually disturbing manner upon the albumin molecule.

The present invention is based upon the discovery that it is in fact possible to unite at least two halogens of different kinds such as iodine and bromine with one and the same albumin molecule and thereby to produce new halogen-albuminous compounds.

The halogen-albuminous compounds of this invention are produced if halogens are caused to act on albumin or albuminous compounds under conditions preventing an excessive rise in temperature.

By means of this invention compounds are produced which contain halogens in an easily separable form.

The following examples serve to illustrate how the invention can be carried into effect.

(1.) To produce a compound containing both chlorine and bromine 200 grms. of wheat bran are allowed to stand for about sixteen hours in contact with about twelve times this quantity of concentrated chlorine water (chlorine contents 0.465%) in a closed vessel at ordinary temperature. After about sixteen hours the whole of the chlorine will be consumed. The chlorinated mass is freed of water, dried and then carefully brominated with a concentrated bromine solution (containing about 40 grms. of bromine). After prolonged standing at normal temperature the bromine is also absorbed into the mass. On analysis the chlorinated-brominated albuminous mass thus obtained gives: Chlorine 2.32%, bromine 14.90%. The resulting mass is of loose texture and slightly coloured.

The halogens can be split off by warming with alkali-carbonates and still more easily by warming with alkalis, which separation is readily recognizable by the halogen-reaction taking place in a short time. In contradistinction thereto the separation takes place only very slowly when cold dilute acetic acid is used. Especially remarkable is the behaviour of the halogen-albumin-compounds under the action of water; namely the fact that even at ordinary temperature a substantial portion of the halogens especially the bromine gradually separate out as such after several hours.

(2.) To produce a compound containing both chlorine and iodine 200 grms. of wheat flour are left in contact with 1500 grms. of concentrated chlorine water (containing 0.525% of chlorine) in a closed vessel at ordinary temperature in a dark place. After about twenty-four hours the chlorine is consumed. The dry preparation is then iodized with an iodine solution.

The mass on analysis gives: Chlorine 1.03%, iodine 10.0%. The high iodine contents of this halogen-albumin-compound are readily recognizable by the dark colour of the preparation.

The chloro-iodine compound behaves like the product of example 1 towards reagents such as alkalis and acids and also with regard to the action of water.

(3.) To produce an iodo-bromine compound 200 grms. of coarse oatmeal are brominated with a solution of 20 grms. of bromine in 1000 grms. of water at ordinary temperature. After prolonged standing the brominated mass is freed from water and is then iodized at ordinary temperature. On analysis the product gives bromine 3.96%, iodine 2.55%. The iodo-bromine compound is dark coloured. Its behaviour towards alkalis and water is the same as that of the product according to Example 1. On treatment with water the greater part of the iodine is split off.

A pharmacologico-physiological test showed that the halogens in the above described compounds were satisfactorily absorbed by the organism.

I claim:

1. The method of producing organic compounds having a plurality of different halogens combined with albumin, which consists in bringing an albumin-containing substance in contact with one of the halogens intended, maintaining the contact at ordinary temperature until that halogen has been absorbed; bringing the product in contact with another of the halogens intended; and maintaining also this contact at ordinary temperature until this halogen has also been absorbed, substantially as described.

2. A new product of manufacture consisting of an organic compound containing a plurality of different halogens combined with one molecule of albumin.

In testimony whereof I affix my signature.

RICHARD WOLFFENSTEIN.